US012456839B2

(12) United States Patent
Song et al.

(10) Patent No.: US 12,456,839 B2
(45) Date of Patent: Oct. 28, 2025

(54) ELECTRICAL CONNECTOR

(71) Applicant: Dongguan Luxshare Technologies Co., Ltd, Dongguan (CN)

(72) Inventors: Tao Song, Dongguan (CN); TieSheng Li, Dongguan (CN); Long Jin, Dongguan (CN)

(73) Assignee: DONGGUAN LUXSHARE TECHNOLOGIES CO., LTD, Dongguan (CN)

(*) Notice: Subject to any disclaimer, the term of this patent is extended or adjusted under 35 U.S.C. 154(b) by 1058 days.

(21) Appl. No.: 17/495,265

(22) Filed: Oct. 6, 2021

(65) Prior Publication Data

US 2022/0200190 A1 Jun. 23, 2022

(30) Foreign Application Priority Data

Dec. 22, 2020 (CN) ........................ 202023117340.2

(51) Int. Cl.
*H01R 13/514* (2006.01)
*H01R 12/70* (2011.01)
*H01R 13/518* (2006.01)
*H01R 13/629* (2006.01)

(52) U.S. Cl.
CPC ....... *H01R 13/514* (2013.01); *H01R 12/7005* (2013.01); *H01R 13/518* (2013.01); *H01R 13/629* (2013.01)

(58) Field of Classification Search
CPC .. H01R 13/514; H01R 13/518; H01R 13/629; H01R 12/7005
USPC .......................................................... 439/701
See application file for complete search history.

(56) References Cited

U.S. PATENT DOCUMENTS

2015/0093942 A1* 4/2015 Wei ........................ H01R 24/64 439/701

* cited by examiner

*Primary Examiner* — Tulsidas C Patel
(74) *Attorney, Agent, or Firm* — Birch, Stewart, Kolasch & Birch, LLP

(57) ABSTRACT

The present disclosure provides an electrical connector module, comprising a first housing, a first connecting board, and a plurality of first connectors. The first housing comprises a first accommodating part. The first connecting board is disposed at one side of the first housing. The plurality of first connectors are disposed in the first accommodating part at intervals along a first direction. The connector assembly comprises an electrical connector module according to the above embodiment, and a mating connector module. The mating connector module comprises a second housing, a second connecting board, and a plurality of second connectors. The second housing is disposed at one side of the second connecting board. The second housing comprises a second accommodating part. The plurality of second connectors is disposed in the second accommodating part along the first direction at intervals. The plurality of second connectors are respectively mated with the plurality of first connectors.

16 Claims, 9 Drawing Sheets

ELECTRICAL CONNECTOR

CROSS-REFERENCE TO RELATED APPLICATION

This application claims the priority benefit of Chinese Patent Application Serial Number 202023117340.2, filed on Dec. 22, 2020, the full disclosure of which is incorporated herein by reference.

BACKGROUND

Technical Field

The present disclosure relates to the technical field of connector, particularly to an electrical connector module and a connector assembly.

Related Art

Conventional connector components comprise a male connector and a female connector mated with the male connector in a one-to-one relationship. Both the back end of the male connector and the back end of the female connector are connected with a cable. In order to increase the connecting density of connectors, the internal configuration of the male connector and the female connector is modified. However, the connecting density of the male connector and the female connector having the same size cannot be maximized due to the modified internal configuration.

SUMMARY

The embodiments of the present disclosure provide an electrical connector module and a connector assembly tended to solve the problem that conventional male and female connectors, which are in a one-to-one connecting relationship, could not be modified into high-density connectors due to their internal configuration.

In one embodiment, an electrical connector module is provided, comprising a first housing, a first connecting board, and a plurality of first connectors. The first housing comprises a first accommodating part. The first connecting board is disposed at one side of the first housing. The plurality of first connectors are disposed in the first accommodating part at intervals along a first direction.

In another embodiment, a connector assembly is provided, comprising an electrical connector module according to the above embodiment, and a mating connector module. The mating connector module comprises a second housing, a second connecting board, and a plurality of second connectors. The second housing is disposed at one side of the second connecting board. The second housing comprises a second accommodating part. The plurality of second connectors is disposed in the second accommodating part along the first direction at intervals. The plurality of second connectors are respectively mated with the plurality of first connectors.

In the embodiments of the present disclosure, the first housing accommodates the plurality of first connectors to integrate the plurality of first connectors to form an electrical connector module, and the second housing accommodates the plurality of second connectors to integrate the plurality of second connectors to form a mating connector module. Thus, the electrical connector module can be mated with the mating connector module, and the plurality of first connectors can be mated with the plurality of second connectors to form a connection in a many-to-many manner, thereby realizing a high-density connector.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include". "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
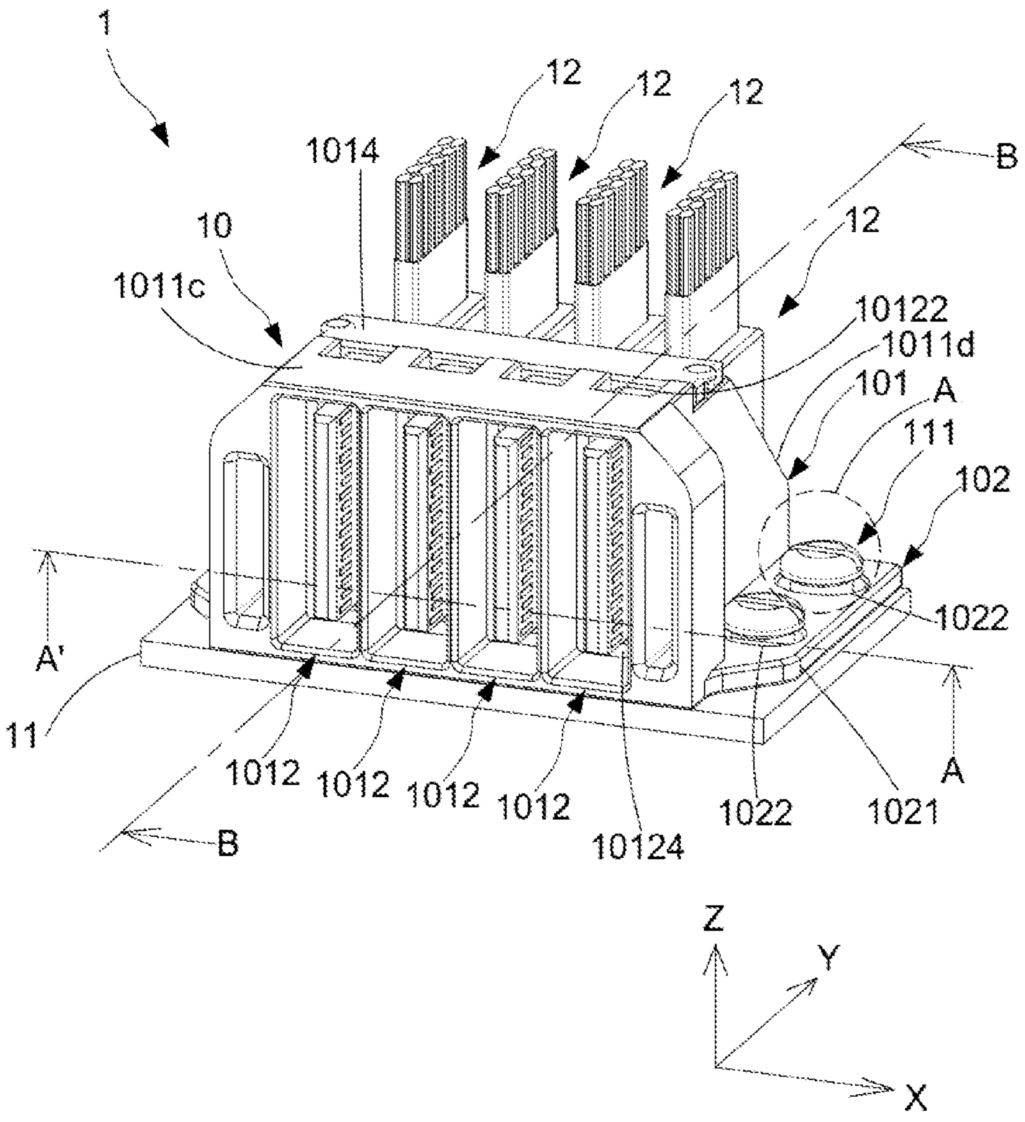
FIG. 1 is a perspective view of an electrical connector module of an embodiment of the present disclosure.
Figure 2:
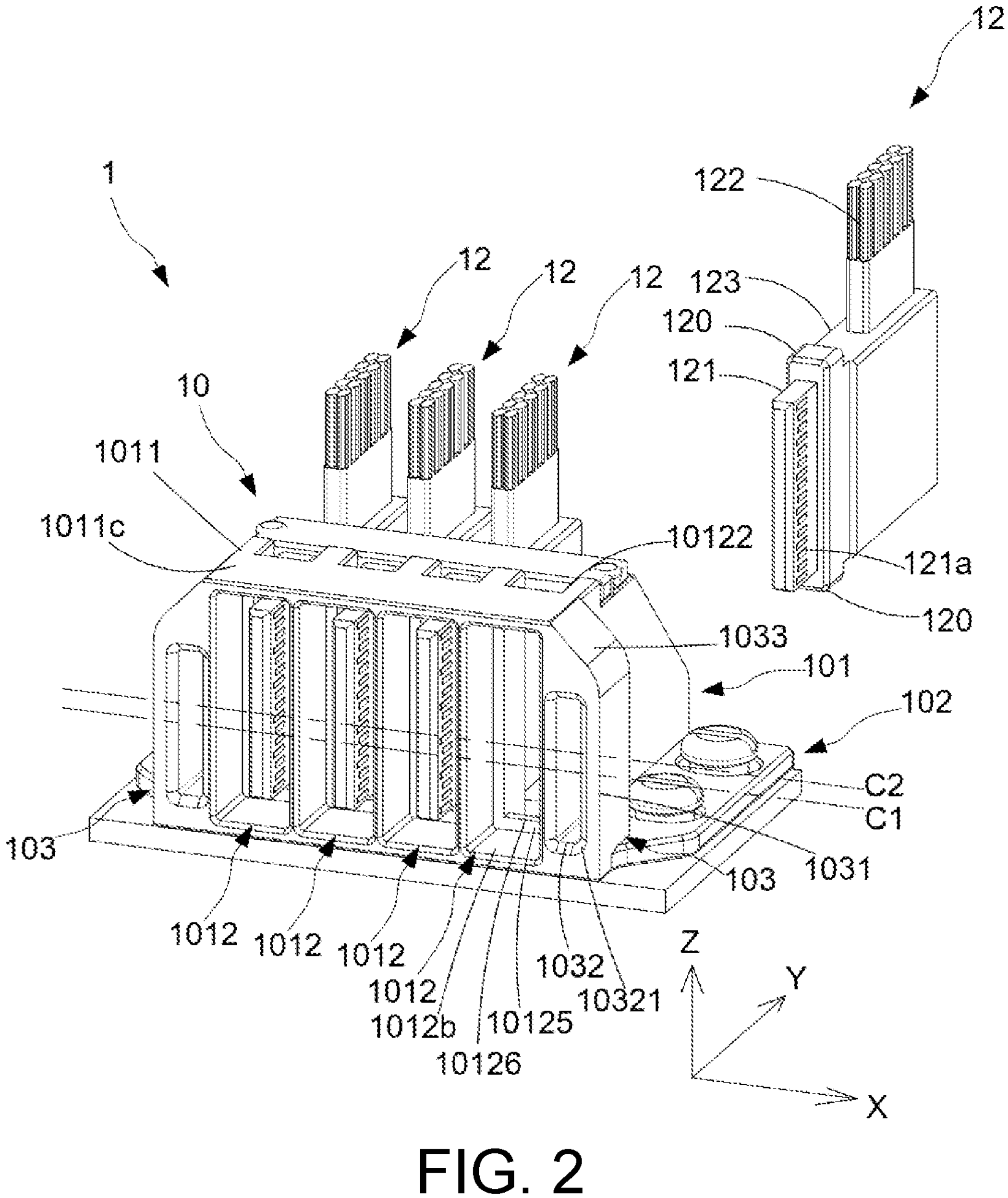
FIG. 2 is an exploded view of an electrical connector module of an embodiment of the present disclosure.
Figure 3:
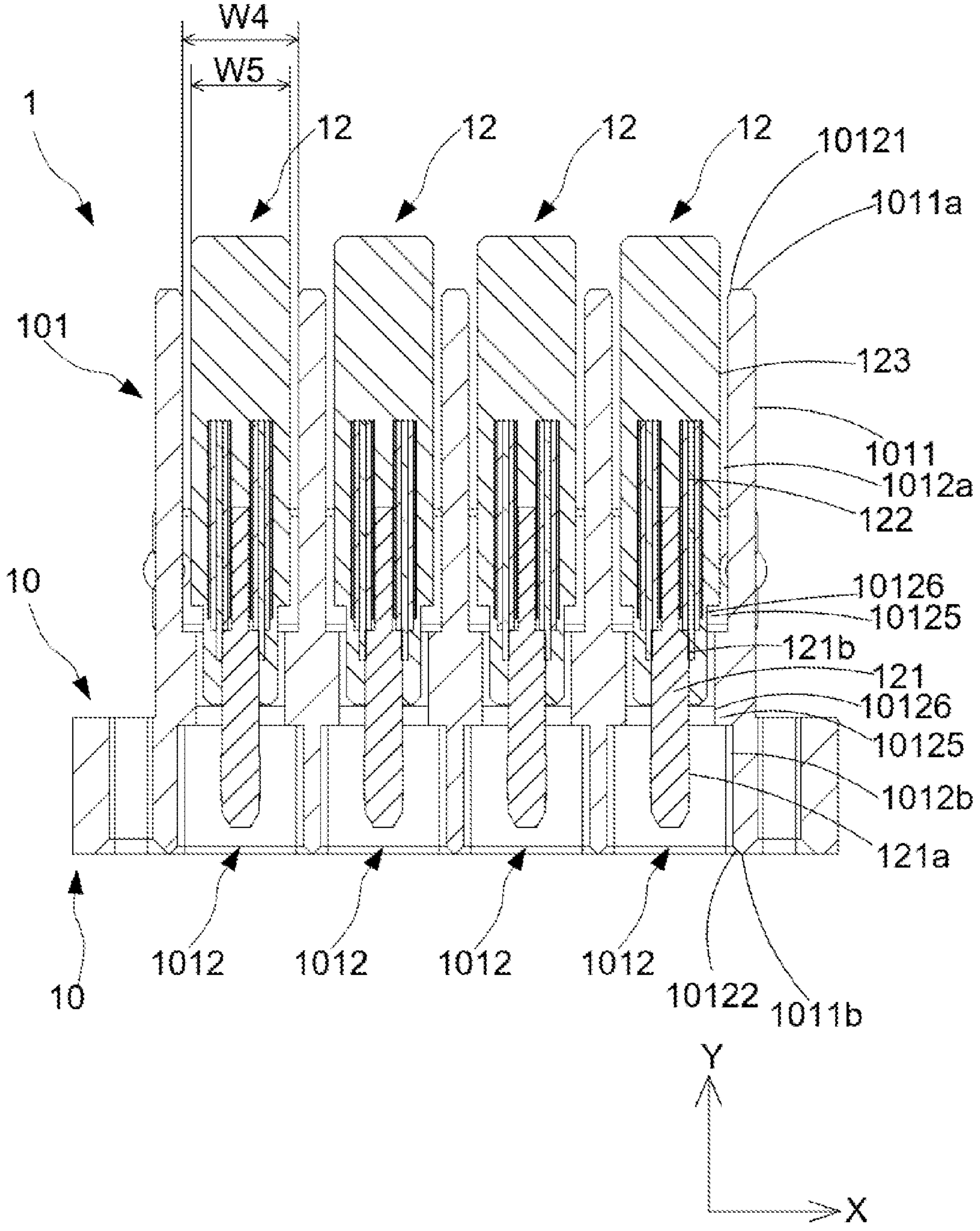
FIG. 3 is a cross-sectional view along line A-A' of FIG. 1.

FIG. 1 and FIG. 2 are perspective view and exploded view of an electrical connector module of an embodiment of the present disclosure. FIG. 3 is a cross-sectional view along line A-A' of FIG. 1. As shown in the figures, in this embodiment, the electrical connector module 1 comprises a first housing 10, a first connecting board 11, and a plurality of first connectors 12. The first housing 10 comprises a first accommodating part 101 and two fine adjustment parts 102. The two fine adjustment parts 102 are oppositely disposed on two sides of the first accommodating part 101. The first connecting board 11 is disposed at one side of the first housing 10 and comprises two first securing parts 111 which are oppositely disposed. The two fine adjustment parts 102 are movably connected with the two first securing parts 111, respectively. The plurality of first connectors 12 are disposed in the first accommodating part 101 at intervals. The first housing 10 moves relative to the first connecting board 11 along a first direction X to drive the plurality of first connectors 12 to move along the first direction X. In this embodiment, the electrical connector module 1 modularizes the plurality of first connectors 12 which can be individually used through the first housing 10, so that a high-density connector can be realized without being affected by the internal configuration of the connector. To allow the electrical connector module 1 to be mated with the mating connector without obstruction, the positions of the plurality of first connectors 12 are adjusted at the same time through the matching correspondence of the fine adjustment part 102 and the securing part.

The structural configuration of the first housing 10 and the first connecting board 11 would be described as follows. The first accommodating part 101 of the first housing 10 comprises an accommodating base body 1011 and a plurality of first through grooves 1012. The accommodating base body 1011 comprises a first disposing surface 1011*a* and a first mating surface 1011*b* opposite to the first disposing surface 1011*a* in a second direction Y. The plurality of first through grooves 1012 are disposed in the accommodating base body 1011 along the first direction X at intervals. The plurality of first through grooves 1012 respectively penetrate the first disposing surface 1011*a* and the first mating surface 1011*b* of the accommodating base body 1011 along the second direction Y. The second direction Y is orthogonal to the first direction X. The plurality of first connectors 12 are respectively disposed in the plurality of first through grooves 1012.

Figure 4:
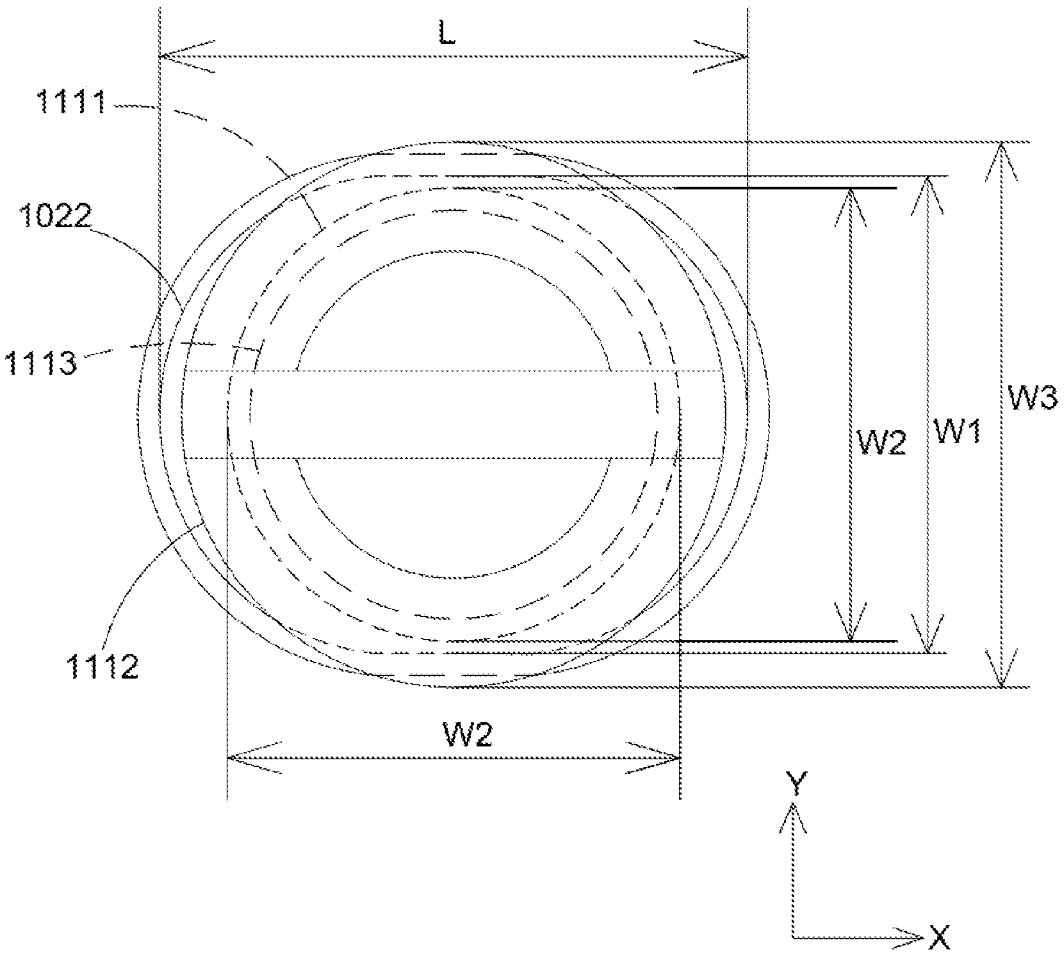
FIG. 4 is a top view of area A of FIG. 1.

FIG. 4 is a top view of area A of FIG. 1. As shown in the figure, the fine adjustment part 102 of the first housing 10 comprises an extending board body 1021 and a fine adjustment hole 1022. The extending board body 1021 is disposed at one side of the accommodating base body 1011 of the first accommodating part 101 and protrudes from the accommodating base body 1011 of the first accommodating part 101 along the first direction X. The fine adjustment hole 1022 is provided in the extending board body 1021 and penetrates the extending board body 1021 along a third direction Z. The third direction Z is orthogonal to the first direction X and the second direction Y. A length L of the fine adjustment hole 1022 in the first direction X is greater than a width W1 of the fine adjustment hole 1022 in the second direction Y The first securing part 111 of the first connecting board 11 comprises a securing column 1111 and a stopping bump 1112 extending in the third direction Z. The stopping bump 1112 is disposed at one end of the securing column 1111. A width W3 of the stopping bump 1112 in the first direction X and the second direction Y is greater than the width W2 of the securing column 1111 in the first direction X and the second direction Y. In this embodiment, the width W2 of the securing column 1111 in the first direction X is equal to the width W2 of the securing column 1111 in the second direction Y. The width W3 of the stopping bump 1112 in the first direction X is equal to the width W3 of the stopping bump 1112 in the second direction Y.

When the two fine adjustment parts 102 of the first housing 10 are movably connected with the two first securing parts 111 of the first connecting board 11 respectively, the securing column 1111 would pass through the corresponding fine adjustment hole 1022 of the fine adjustment part 102. The stopping bump 1112 is disposed at one side of the corresponding fine adjustment part 102 away from the first connecting board 11. The width W2 of the securing column 1111 in the first direction X is smaller than the length L of the fine adjustment hole 1022 in the first direction X. The width W3 of the stopping bump 1112 in the second direction Y is greater than the width W1 of the fine adjustment hole 1022 in the second direction Y The stopping bump 1112 coordinates with the fine adjustment hole 1022 to restrict the first housing 10 from detaching from the first connecting board 11 along the third direction Z, and the securing column 1111 coordinates with the fine adjustment hole 1022 to allow the first housing 10 to move relative to the first connecting board 11 in the first direction X. In this way, the first housing 10 could synchronously drive the plurality of first connectors 12 for fine adjustment along the first direction X. In this embodiment, a gap exists between the stopping bump 1112 and a surface of the extending board body 1021 of the fine adjustment part 102 away from the first connecting board 11, so the first housing 10 could move relative to the first connecting board 11 in the first direction X without obstruction. The first securing part 111 of this embodiment further comprises a securing hole 1113. One end of the securing column 1111 away from the stopping bump 1112 is movably connected with the securing hole 1113, which also indicates that the securing column 1111 connected with the stopping bump 1112 is secured on the securing hole 1113. The securing column 1111 and the stopping bump 1112 which are interconnected can be considered a bolt.

In this embodiment, a width W4 of the first through groove 1012 in the first direction X is greater than a width W5 of the first connector 12 in the first direction X. In this way, the plurality of first connectors 12 can respectively move in the corresponding first through groove 1012 along the first direction X. In general, the plurality of first connectors 12 could be driven by the first housing 10 to move synchronously in the first direction X, and meanwhile, each of the first connectors 12 could move to the corresponding first through groove 1012 along the first direction X. In this way, the adjustability of the plurality of first connectors 12 can be increased to facilitate the mating with the mating connector module 2.

Figure 5:
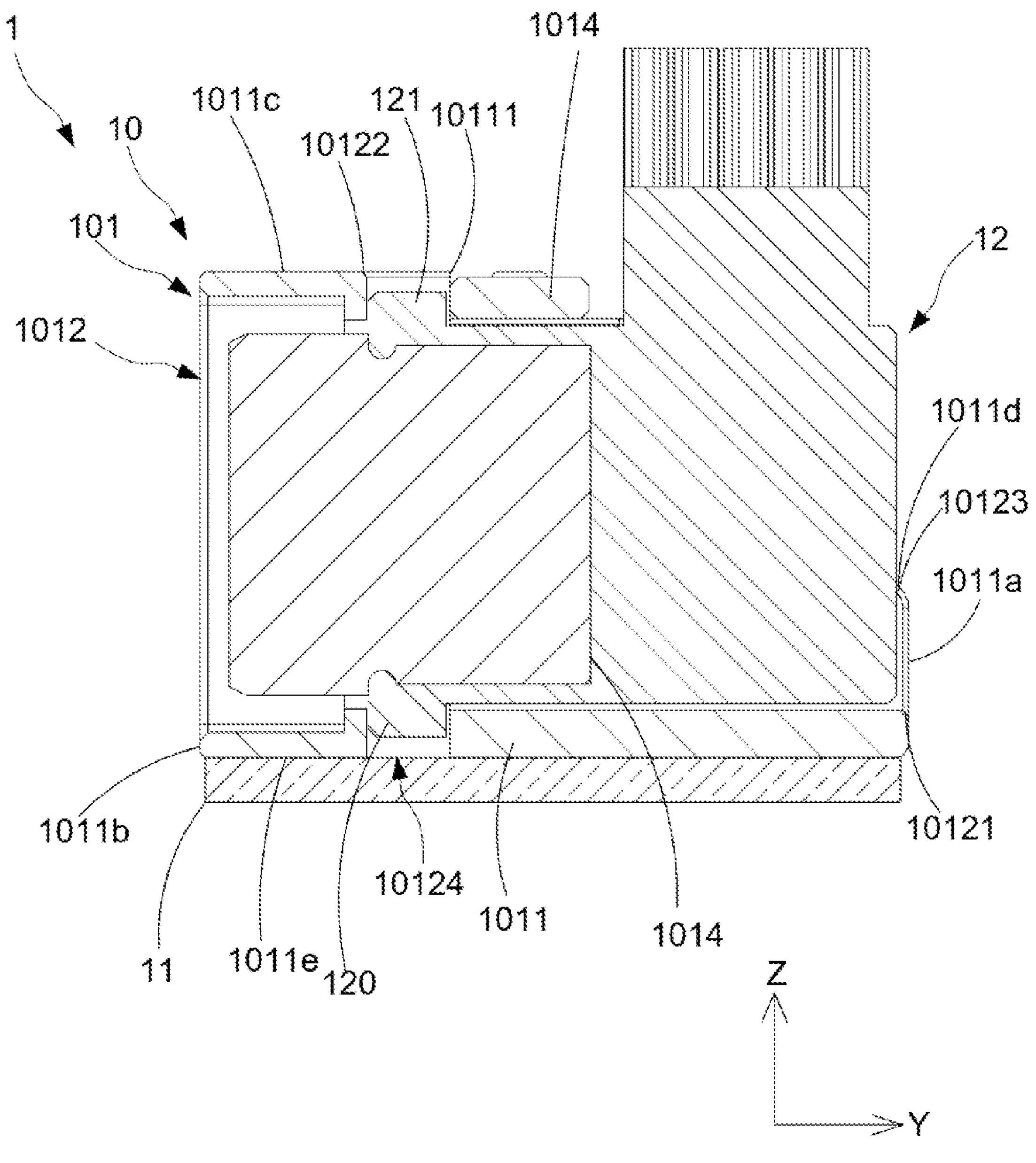
FIG. 5 is a cross-sectional view along line B-B' of FIG. 1.

FIG. 5 is a cross-sectional view along line B-B' of FIG. 1. As shown in the figure, in this embodiment, the plurality of first through grooves 1012 could form a plurality of first openings 10121 on the first disposing surface 1011*a*. The plurality of first connectors 12 are respectively inserted into the corresponding first through grooves 1012 through the plurality of first openings 10121. The plurality of first through grooves 1012 could further form a plurality of second openings 10122 on an upper surface 1011*c* of the accommodating base body 1011. The plurality of second openings 10122 are respectively communicated with the plurality of first openings 10121. The insertion area of the first connector 12 can be increased through the second openings 10122. Each of the first connectors 12 can be simply disposed in the corresponding first through groove 1012 through the first opening 10121 and the second opening 10122.

In this embodiment, an inclined surface 1011*d* exists between the upper surface 1011*c* and the first disposing surface 1011*a* of the accommodating base body 1011. The plurality of first through grooves 1012 form a plurality of third openings 10123 on the inclined surface 1011*d*. The plurality of second openings 10122 are respectively communicated with the plurality of third openings 10123 and the plurality of first openings 10121. When the plurality of first connectors 12 are respectively disposed in the plurality of first through grooves 1012, the plurality of first connectors 12 would be respectively disposed in the corresponding third openings 10123 and protrude from the inclined surface 1011*d*. In this way, it is convenient to take out the plurality of first connectors 12 from the first housing 10.

Figure 6:
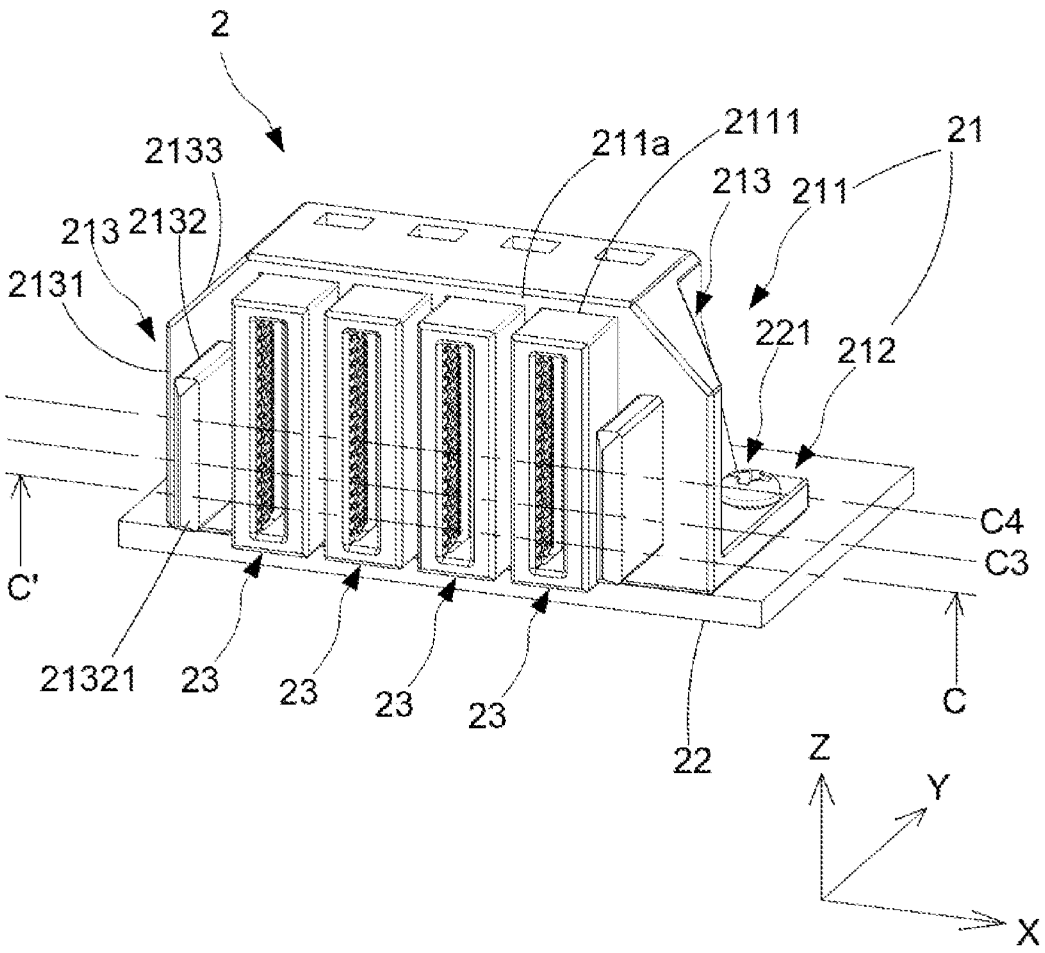
FIG. 6 is a perspective view of a mating connector module of an embodiment of the present disclosure.
Figure 7:
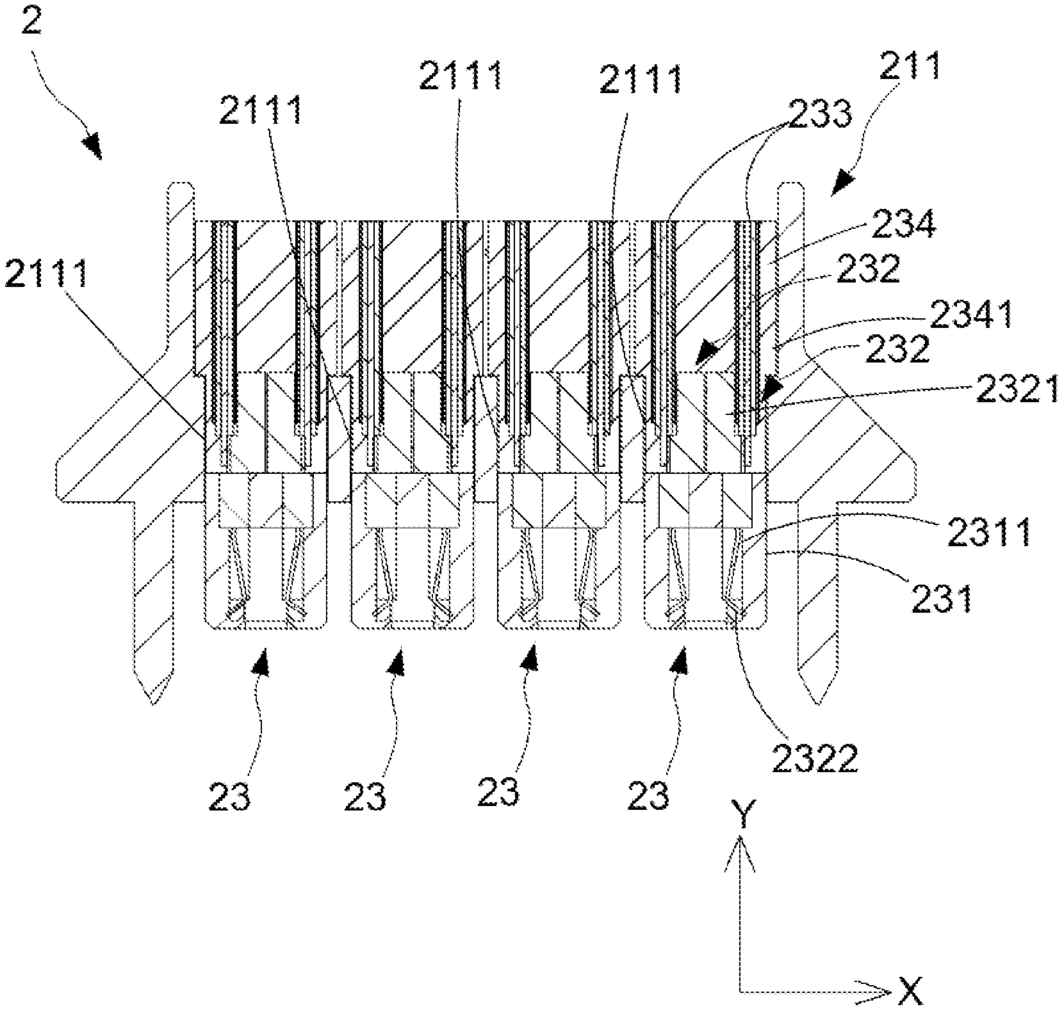
FIG. 7 is a cross-sectional view along line C-C' of FIG. 6.

FIG. 6 is a perspective view of a mating connector module of an embodiment of the present disclosure. FIG. 7 is a cross-sectional view along line C-C of FIG. 6. As shown in the figures, the mating connector module 2 mated with the electrical connector module 1 of this embodiment comprises a second housing 21, a second connecting board 22, and a plurality of second connectors 23. The second housing 21 comprises a second accommodating part 211 and two connecting parts 212. The two connecting parts 212 are disposed at two sides of the second accommodating part 211. The second accommodating part 211 comprises a second mating surface 211*a* and a plurality of second through grooves 2111. The plurality of second through grooves 2111 are disposed on the second mating surface 211*a* at intervals and penetrate the second mating surface 211*a*. The second housing 21 is disposed at one side of the second connecting board 22. The second connecting board 22 comprises two second securing parts 221 oppositely disposed. The two connecting parts 212 are respectively connected with the two second securing parts 221 to secure the second housing 21 on the second connecting board 22. The plurality of second connectors 23 are respectively disposed in the plurality of second through grooves 2111, which indicates that the plurality of second connectors 23 are disposed in the second accommodating part 211 at intervals along the first direction X. The mating connector module 2 modularizes the plurality of second connectors 23 that can be used independently through the second housing 21.

Figure 8:
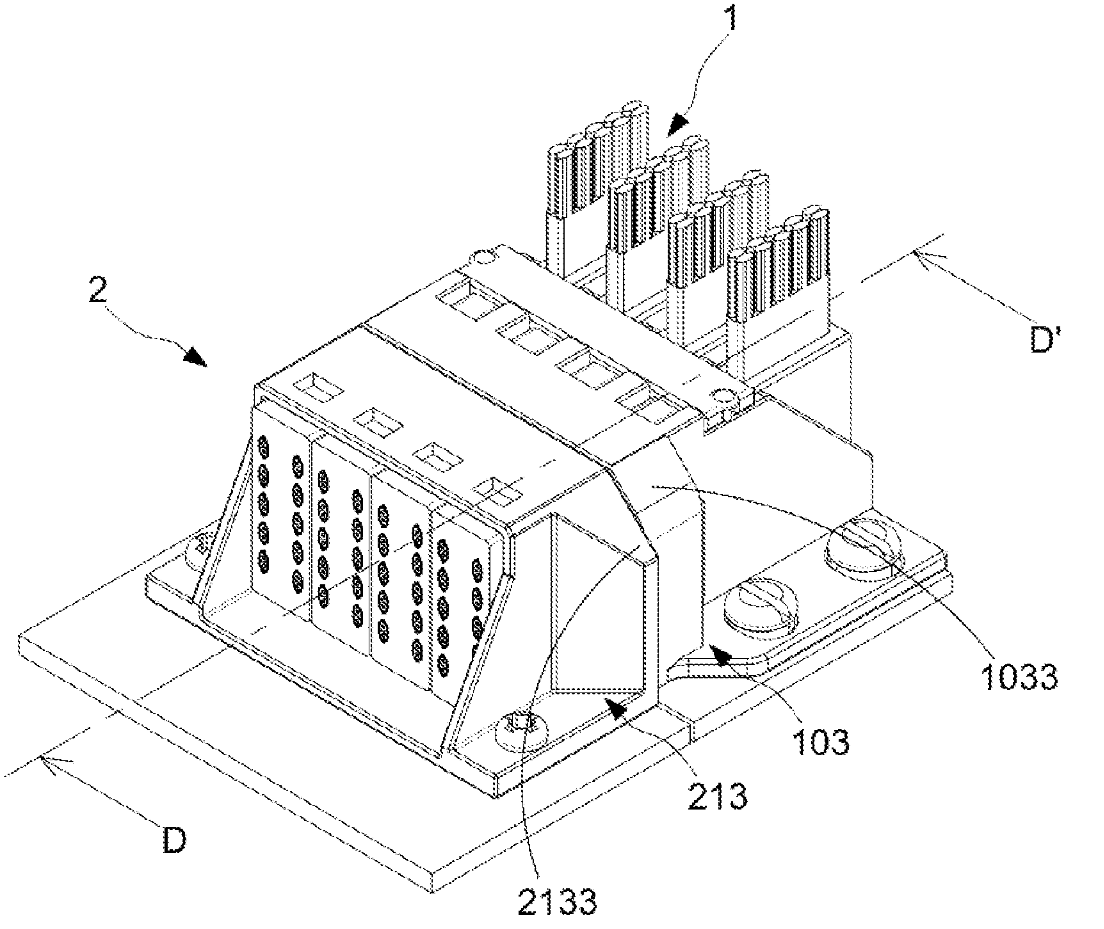
FIG. 8 is a perspective view of the connecting between the electrical connector module and the mating connector module of an embodiment of the present disclosure.
Figure 9:
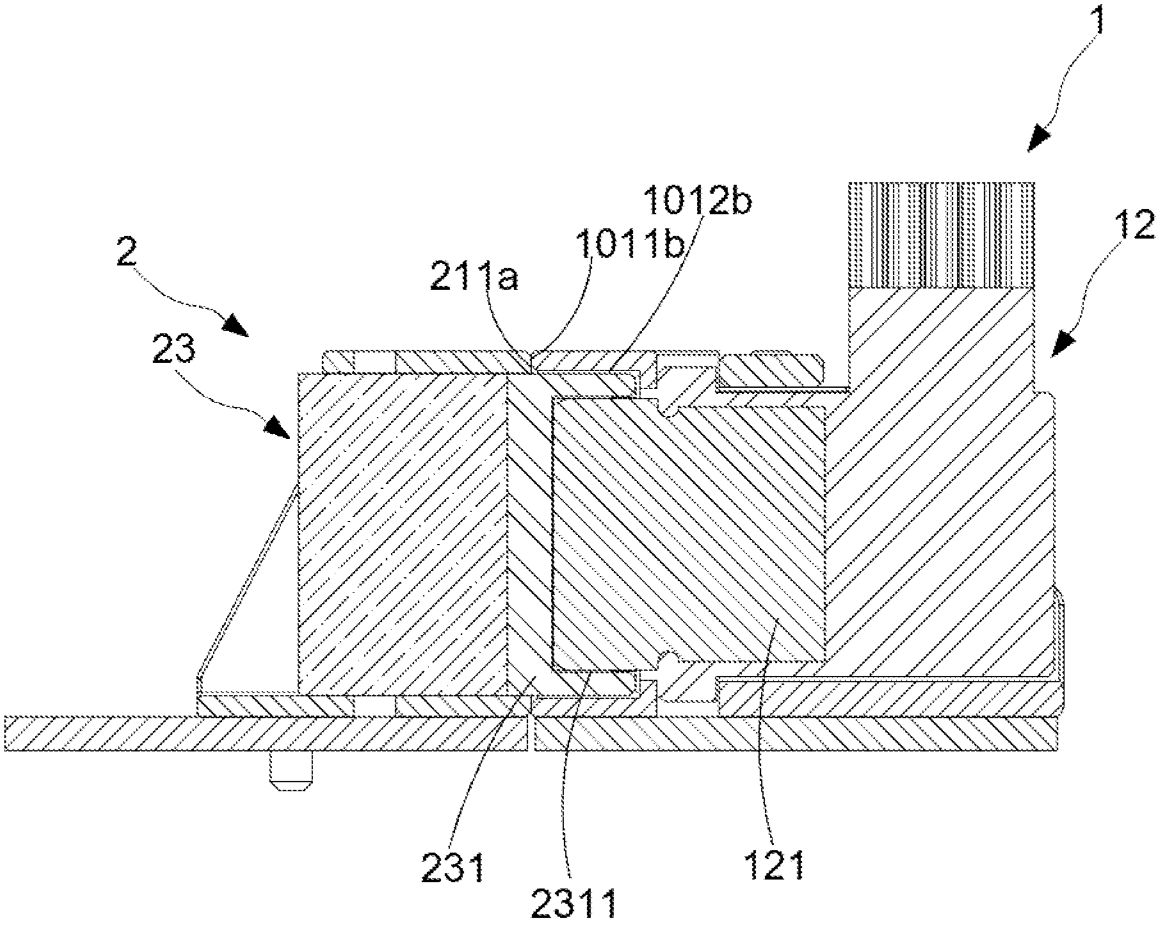
FIG. 9 is a cross-sectional view along line D-D' of FIG. 8.

FIG. 8 is a perspective view of the connecting between the electrical connector module and the mating connector module of an embodiment of the present disclosure. FIG. 9 is a cross-sectional view along line D-D' of FIG. 8. As shown in the figures, When the electrical connector module 1 is mated with the mating connector module 2, the first mating surface 1011*b* of the electrical connector module 1 would be in contact with the second mating surface 211*a* of the mating connector module 2, and the plurality of first connectors 12 of the electrical connector module 1 would be respectively mated with the plurality of second connectors 23 of the mating connector module 2. When the plurality of first connectors 12 cannot be mated with the plurality of second connectors 23 without obstruction, that is, when the centers of the plurality of first connectors 12 are offset in the first direction X with respect to the centers of the plurality of second connectors 23, the first housing 10 can be moved to synchronously drive the plurality of first connectors 12 to move in the first direction X, allowing the centers of the first connectors 12 to be aligned with the centers of the second connectors 23, so that the plurality of first connectors 12 could be mated with the plurality of second connectors 23 without obstruction. In this way, a many-to-many connection relationship could be established between the electrical connector module 1 and the mating connector module 2, forming a connector assembly as the electrical connector module 1 mating with the mating connector module 2. The electrical connector module 1 could synchronously adjust the positions of the plurality of first connectors 12 according to the positions of the plurality of second connectors 23 of the mating connector module 2, so the plurality of first connectors 12 of the electrical connector module 1 could be accurately mated with the plurality of second connectors 23 of the connector module 2 to achieve blind insertion.

Referring to FIG. 2 and FIG. 5 again, the upper surface 1011*c* of the accommodating base body 1011 further comprises a notch 10111. The plurality of second openings 10122 and the plurality of third openings 10123 are in communication with the notch 10111. A surface of a sidewall of the plurality of first through grooves 1012 disposed in the notch 10111 away from the first connecting board 11 and in the third direction Z is aligned with a surface of each of the first connectors 12 away from the first connecting board 11 and in the third direction Z. In this embodiment, the first accommodating part 101 further comprises a pressing board 1014. The pressing board 1014 is disposed in the notch 10111 and is disposed on the surface of the sidewalls of the plurality of first through grooves 1012 away from the first connecting board 11 and in the third direction Z, so as to prevents the plurality of first connectors 12 from detaching from the corresponding first through grooves 1012 along the third direction Z. In this embodiment, a lower surface 1011*e* of the accommodating base body 1011 further comprises a plurality of fourth openings 10124. The plurality of fourth openings 10124 are respectively communicated with the plurality of first through grooves 1012 and respectively correspond to the plurality of second openings 10122. Two opposite surfaces of the first connector 12 in the third direction Z respectively comprise a positioning bump 120. When the first connector 12 is disposed in the first through groove 1012, the two positioning bumps 120 of the first connector 12 would enter the second opening 10122 and the fourth opening 10124. A sidewall of the second opening 10122 and a sidewall of the fourth opening 10124 could limit the two positioning bumps 120 of the first connector 12 to position the first connector 12 in the first through groove 1012. When the plurality of first connectors 12 are respectively disposed in the plurality of first through grooves 1012, the pressing board 1014 would be disposed in the notch 10111. The pressing board 1014 abuts against a surface of the plurality of positioning bumps 120 in the plurality of second openings 10122 away from the first mating surface 1011*b* and abuts against a surface of the plurality of first connectors 12 away from the first connecting board 11 and in the third direction Z. In this way, not only the plurality of first connectors 12 can be prevented from being detached along the third direction Z but also the plurality of first connectors 12 can be prevented from being detached along the second direction Y The positioning bump 120 can also be provided on only one side of the first connector 12, so the plurality of fourth openings 10124 can be omitted.

In other embodiments, the pressing board 1014 and the accommodating base body 1011 are integrally formed to one piece, and the positioning bump 120 is retractable. When the first connector 12 is disposed in the corresponding first through groove 1012, as the positioning bump 120 passes through the pressing board 1014 and the sidewall of the first through groove 1012, the two positioning bumps 120 would be retracted into the first connector 12. When passing through the pressing board 1014, the two positioning bumps 120 would extend from the first connector 12 and enter the second opening 10122 and the fourth opening 10124 for the same effects described above.

Referring to FIG. 2 and FIG. 6 again, in this embodiment, the first housing 10 of the electrical connector module 1 further comprises two first guiding parts 103 respectively disposed on two sides of the first accommodating part 101. The first guiding part 103 comprises a first guiding base body 1031 and a guiding hole 1032 and is disposed at one side of the accommodating base body 1011. The guiding hole 1032 penetrates the first guiding base body 1031 along the second direction Y The first centerline C1 of the guiding hole 1032 parallel to the first direction X is offset relative to the second centerline C2 of the first accommodating part 101 parallel to the first direction X. That is, a gap exists between the first centerline C1 and the second centerline C2.

The second housing 21 of the mating connector module 2 further comprises two second guiding parts 213 respectively disposed at two sides of the second accommodating part 211. The second guiding part 213 comprises a second guiding base body 2131 and a guiding bump 2132. The second guiding base body 2131 is disposed at one side of the second accommodating part 211. The guiding bump 2132 protrudes from the second guiding base body 2131 along the second direction Y. The third centerline C3 of the guiding bump 2132 parallel to the first direction X is offset relative to the fourth centerline C4 of the second through groove 2111 parallel to the first direction X. That is, a gap exists between the third centerline C3 and the fourth centerline C4. In this embodiment, the first centerline C1 of the guiding hole 1032 parallel to the first direction X is disposed below the second centerline C2 of the first through groove 1012 parallel to the first direction X. The third centerline C3 of the guiding bump 2132 parallel to the first direction X is disposed below the fourth centerline C4 of the second through groove 2111 parallel to the first direction X. The size of the guiding hole 1032 is identical to the size of the guiding bump 2132.

When the electrical connector module 1 and the mating connector module 2 are mated in a positive direction, the first centerline C1 of the guiding hole 1032 parallel to the first direction X is aligned with the third centerline C3 of the guiding bump 2132 parallel to the first direction X, so that the guiding bump 2132 can be inserted into the corresponding guiding hole 1032 to allow the plurality of first connectors 12 to be connected with the plurality of second connectors 23, respectively. When the electrical connector module 1 and the mating connector module 2 are reversely mated, a gap would exist between the first centerline C1 of the guiding hole 1032 parallel to the first direction X and the centerline C3 of the guiding bump 2132 parallel to the first direction X, so that the guiding bump 2132 could not be simply inserted into the corresponding guiding hole 1032, which also indicates that this embodiment comprises the ability to perform guiding effect through the first guiding part 103 and the second guiding part 213. In this way, the electrical connector module 1 can be prevented from being reversely connected to the mating connector module 2.

In this embodiment, one end of the guiding hole 1032 close to the first mating surface 1011*b* comprises a first guiding inclined surface 10321. One end of the guiding bump 2132 away from the second mating surface 211*a* comprises a second guiding inclined surface 21321. The second guiding inclined surface 21321 corresponds to the first inclined surface 10321. The first guiding inclined surface 10321 could enlarge the size of one end of the guiding hole 1032 close to the first mating surface 1011*b*. The second guiding inclined surface 21321 could reduce the size of one end of the guiding bump 2132 away from the second mating surface 211*a*. Thus, the guiding bump 2132 can be inserted into the guiding hole 1032 without obstruction.

Referring to FIG. 8, in this embodiment, one side of the first guiding base body 1031 of the first guiding part 103 away from the first connecting board 11 comprises a first aligning inclined surface 1033. One side of the second guiding base body 2131 of the second guiding part 213 away from the second connecting board 22 comprises a second aligning inclined surface 2133. When the electrical connector module 1 is mated with the mating connector module 2, the electrical connector module 1 can be ensured to be positively connected with the mating connector module 2 by aligning the first aligning inclined surface 1033 of the electrical connector module 1 with the second aligning inclined surface 2133 of the mating connector module 2.

In this embodiment, the first connector 12 is a male connector, and the second connector 23 is a female connector. Since the volume of the male connector of this embodiment is smaller than the volume of the female connector, the fine adjustment part 102 is disposed on the first housing 10 that accommodates the male connector to prevent the fine adjustment part 102 from being disposed on the second housing 21 to increase the volume of the mating connector module 2 having a female connector. The volume of the female connector can also be smaller than the volume of the male connector so that the fine adjustment part 102 would be disposed on the second housing 21 accommodating the female connector. Referring to FIG. 2 and FIG. 3, in this embodiment, the first connector 12 comprises a circuit board 121, a plurality of first cables 122, and a first insulating body 123. The circuit board 121 comprises a plurality of contacting pads 121*a* and a plurality of cable connecting pads 121*b*. The plurality of cable connecting pads 121*b* are disposed at one side of the plurality of contacting pads 121*a* The plurality of cable connecting pads 121*b* are respectively connected with the plurality of contacting pads 121*a*. One ends of the plurality of first cables 122 are respectively connected with the plurality of cable connecting pads 121*b*. Each of the first cables 122 comprises a plurality of wires (for example, a signal wire or a ground wire). The plurality of wires are respectively connected with the plurality of cable connecting pads 121*b*. The first insulating body 123 covers a part of the circuit board 121 and a part of the plurality of first cables 122. One side of the circuit board 121 having the plurality of contacting pads 121*a* protrudes from one side of the first insulating body 123. The plurality of contacting pads 121*a* are exposed from one side of the first insulating body 123. The other ends of the plurality of first cables 122 protrudes from the other side of the first insulating body 123. When the first connector 12 is disposed in the first through groove 1012 of the first housing 10, the circuit board 121 of the first connector 12 would be vertically disposed, the plurality of contacting pads 121*a* and the plurality of cable connecting pads 121*b* would be disposed along the third direction Z at intervals, the plurality of contacting pads 121*a* and the plurality of cable connecting pads 121*b* would be disposed along the third direction Z at intervals, and the circuit board 121 would face to the first mating surface 1011*b*.

In this embodiment, a limit partitioning board 10125 is provided in each of the first through grooves 1012. The limit partitioning board 10125 comprises a through hole 10126 and divides the first through groove 1012 into an accommodating area 1012*a* and a mating area 1012*b*. The accommodating area 1012*a* communicates with the mating area 1012*b* through the through hole 10126. The first insulating body 123 of the first connector 12 is disposed in the accommodating area 1012*a*. The circuit board 121 passes through the through hole 10126 and is disposed in the mating area 1012*b*. The length of the through hole 10126 in the third direction Z is longer than the length of the circuit board 121 in the third direction Z. Meanwhile, the length of the through hole 10126 in the third direction Z is shorter than the length of the first insulating body 123 in the third direction Z. In this way, the limit partitioning board 10125 can block the first insulating body 123 from moving to the mating area 1012*b* to position the first insulating body 123 in the accommodating area 1012*a*.

Referring to FIG. 7 again, in this embodiment, the second connector 23 comprises a second insulating body 231, two terminal modules 232, a plurality of second cables 233, and a covering body 234. The second insulating body 231 comprises a mating slot 2311 in which the two terminal modules 232 are oppositely disposed. The two terminal modules 232 respectively comprise a terminal insulating body 2321 and a plurality of terminals 2322. The terminal insulating body 2321 is disposed at the plurality of terminals 2322 and covers a part of the plurality of terminals 2322. One ends of the plurality of second cables 233 are respectively connected with a plurality of terminals 2322 of the two terminal modules 232. The covering body 234 is disposed at the plurality of second cables 233 and covers a part of the plurality of second cables 233. The covering body 234 is adjacent to the second insulating body 231. The second insulating body 231 protrudes from the second mating surface 211*a*. The width of the second through groove 2111 in the first direction X and the length of the second through groove 2111 in the third direction Z are equal to the width of the second insulating body 231 in the first direction X and the length second insulating body 231 in the third direction Z. In this way, the second insulating body 231 of the mating connector module 2 can be secured in the second through groove 2111. In this embodiment, a sidewall of the covering body 234 is provided with a limiting bump 2341. When the second connector 23 is disposed in the corresponding second through groove 2111, the limiting bump 2341 would abut against a surface of the second through groove 2111 away from the second mating surface 211*a* to prevents the second connector 23 from detaching from the second direction Y.

When the electrical connector module 1 is mated with the mating connector module 2, the second insulating body 231 would enter the mating area 1012*b* of the electrical connector module 1, the circuit board 121 would be inserted into the mating slot 2311 of the second insulating body 231, and the plurality of terminals 2322 would be in contact with the plurality of contacting pads 121*a* of the circuit board 121. Two sides of the covering body 234 in the first direction X are respectively provided with a limiting bump 2341. The limiting bump 2341 abuts against the surface of the sidewall of the second through groove 2111 in the first direction X away from the second mating surface 211*a* to prevent the second connector 23 from detaching from the second mating surface 211*a*.

In summary, embodiments of the present disclosure provide an electrical connector module and a connector assembly. The first housing accommodates the plurality of first connectors to integrate the plurality of first connectors to form an electrical connector module, and the second housing accommodates the plurality of second connectors to integrate the plurality of second connectors to form a mating connector module. Thus, the electrical connector module can be mated with the mating connector module, and the plurality of first connectors can be mated with the plurality of second connectors, forming a connection in a many-to-many manner, thereby realizing a high-density connector.

Besides, for the connection between the electric connector module and the mating connector module, the plurality of first connectors of the electrical connector module could be finely adjusted according to the positions of the plurality of second connectors of the mating connector module through the coordination of the fine adjustment part and the securing part. Thus, the plurality of first connectors can be accurately connected with the plurality of second connectors. Meanwhile, through the coordination of the first guiding part and the second guiding part, the electrical connector module would not be reversely connected with the mating connector module, realizing blind insertion.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An electrical connector module, comprising:

a first housing comprising a first accommodating part and two fine adjustment parts, wherein the two fine adjustment parts respectively comprise a fine adjustment hole;

a first connecting board disposed at one side of the first housing, the first connecting board comprising two opposite securing parts, wherein the two securing parts respectively comprise a securing column, and the securing column is movably connected with the fine adjustment hole; and a plurality of first connectors disposed in the first accommodating part at intervals along a first direction;

wherein, a length of the fine adjustment hole in the first direction is greater than a width of the securing column in the first direction; the first housing moves in the first direction relative to the first connecting board to drive the plurality of first connectors to move along the first direction.

2. The electrical connector module according to claim 1, wherein the width of the securing column in a second direction is smaller than or equal to the length of the fine adjustment hole in the second direction; the second direction is orthogonal to the first direction.

3. The electrical connector module according to claim 1, wherein the two fine adjustment parts respectively comprise an extending board body; the extending board body is disposed at one side of the first accommodating part and protrudes from the first accommodating part along the first direction; the fine adjustment hole is disposed on the extending board body and penetrates the extending board body along a third direction; the third direction is orthogonal to the first direction.

4. The electrical connector module according to claim 1, wherein the two securing parts respectively comprise a stopping bump; the stopping bump is disposed at one end of the securing column; the stopping bumps of the two securing parts are respectively disposed at one side of the two fine adjustment parts away from the first connecting board; the width of the stopping bump in the second direction is greater than the width of the fine adjustment hole in the second direction; the second direction is orthogonal to the first direction.

5. The electrical connector module according to claim 4, wherein a gap exists between the stopping bumps of the two securing parts and the surfaces of the two fine adjustment parts away from the first connecting board, respectively.

6. An electrical connector module, comprising:

a first housing comprising a first accommodating part, the first accommodating part comprising an accommodating base body and a plurality of first through grooves; the plurality of first through grooves disposed on the accommodating base body along a first direction at intervals; the plurality of first connectors respectively disposed in the plurality of first through grooves;

a first connecting board disposed at one side of the first housing;

a plurality of first connectors disposed in the first accommodating part at intervals along the first direction;

wherein a width of any one of the plurality of first through grooves in the first direction is greater than the width of any one of the plurality of first connectors in the first direction.

7. The electrical connector module according to claim 6, wherein the first housing further comprises a first disposing surface and an upper surface; the plurality of first through grooves form a plurality of first openings on the first disposing surface; the plurality of first through grooves form a plurality of second openings on the upper surface; the plurality of second openings are respectively communicated with the plurality of first openings; the plurality of first connectors respectively enter the plurality of first through grooves through the plurality of first openings and the plurality of second openings.

8. The electrical connector module according to claim 7, wherein an inclined surface exists between the upper surface and the first disposing surface of the accommodating base body; the plurality of first through grooves form a plurality of third openings on the inclined surface; the plurality of third openings are respectively in communication with the plurality of second openings and the plurality of first openings; the plurality of first connectors are disposed at the plurality of third openings and protrude from the inclined surface.

9. The electrical connector module according to claim 7, wherein the upper surface further comprises a notch communicating with the plurality of second openings; a surface of the sidewalls of the plurality of first through grooves in the notch away from the first connecting board and in the third direction is aligned with a surface of the plurality of first connectors away from the first connecting board and in the third direction; the third direction is orthogonal to the first direction.

10. The electrical connector module according to claim 9, wherein the first accommodating part further comprises a pressing board; the pressing board is disposed in the notch and is disposed on the surfaces of the plurality of first connectors away from the first connecting board and in the third direction.

11. The electrical connector module according to claim 10, wherein the surfaces of the plurality of first connectors away from the first connecting board and in the third direction respectively comprises a positioning bump; the positioning bumps of the plurality of first connectors are respectively disposed at the plurality of second openings; the pressing board abuts against the positioning bumps disposed at the plurality of second openings.

12. The electrical connector module according to claim 11, wherein the accommodating base body comprises a lower surface comprising a plurality of fourth openings;

the plurality of fourth openings correspond to the plurality of second openings; the surfaces of the plurality of first connectors close to the first connecting board and in the third direction respectively comprises a positioning bump; the positioning bumps of the plurality of first connectors are respectively disposed in the plurality of fourth openings.

13. A connector assembly, comprising:

an electrical connector module according to claim 1; and a mating connector module comprising a second housing, a second connecting board and a plurality of second connectors, the second housing being disposed at one side of the second connecting board, the second housing comprising a second accommodating part, the plurality of second connectors being disposed in the second accommodating part along the first direction at intervals, the plurality of second connectors being respectively mated with the plurality of first connectors.

14. The connector assembly according to claim 13, wherein the first housing further comprises two first guiding parts disposed at two sides of the first accommodating part; the two first guiding parts respectively comprise a guiding hole; a first centerline of the guiding hole parallel to the first direction is offset relative to a second centerline of the first accommodating part parallel to the first direction; the second housing further comprises two second guiding parts disposed at two sides of the second accommodating part; the two second guiding parts respectively comprise a guiding bump; a third centerline of the guiding bump parallel to the first direction is offset relative to a fourth centerline of the second accommodating part parallel to the first direction;

the guiding bump is disposed in the guiding hole; the first centerline is aligned with the second centerline.

15. The connector assembly according to claim 13, wherein the first connector comprises a circuit board, a plurality of first cables, and a first insulating body; the circuit board comprises a plurality of contacting pads and a plurality of cable connecting pads connected to the plurality of contacting pads; one ends of the plurality of first cables are respectively connected with the plurality of cable connecting pads; the first insulating body covers a part of the circuit board and a part of the plurality of first cables; one side of the circuit board close to the plurality of contacting pads protrudes from one side of the first insulating body; the plurality of contacting pads are exposed from one side of the first insulating body; the other ends of the plurality of first cables pass through the other side of the first insulating body.

16. The connector assembly according to claim 13, wherein the plurality of second connectors respectively comprise a second insulating body, two terminal modules, a plurality of second cables, and a covering body; the second insulating body comprises a mating slot in which the two terminal modules are oppositely disposed; the two terminal modules comprise a plurality of terminals; one ends of the plurality of second cables are respectively connected with the plurality of terminals; the covering body covers the plurality of second cables and is adjacent to the second insulating body.

* * * * *